US011288361B1

United States Patent
Salehpour et al.

(10) Patent No.: US 11,288,361 B1
(45) Date of Patent: Mar. 29, 2022

(54) SYSTEMS AND METHODS FOR RESTORING APPLICATIONS

(71) Applicant: Symantec Corporation, Mountain View, CA (US)

(72) Inventors: Jonathon Salehpour, Upland, CA (US); Radoslav Stanev, Tehachapi, CA (US); Somard Kruayatidee, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 552 days.

(21) Appl. No.: 16/369,404

(22) Filed: Mar. 29, 2019

(51) Int. Cl.
*G06F 21/53* (2013.01)
*G06F 8/71* (2018.01)

(52) U.S. Cl.
CPC .............. *G06F 21/53* (2013.01); *G06F 8/71* (2013.01); *G06F 2221/033* (2013.01); *G06F 2221/2149* (2013.01)

(58) Field of Classification Search
CPC .... G06F 21/53; G06F 21/57; G06F 2221/033; G06F 2221/2149; G06F 8/65; G06F 8/71; H04M 1/72406
See application file for complete search history.

(56) References Cited

U.S. PATENT DOCUMENTS

| 8,290,763 | B1* | 10/2012 | Zhang | G06F 21/53 703/26 |
| 2007/0245337 | A1* | 10/2007 | Willis, II | G06F 8/65 717/168 |
| 2009/0100272 | A1* | 4/2009 | Smeets | G06F 21/6209 713/189 |
| 2011/0010701 | A1* | 1/2011 | Cooper | H04L 29/0854 717/175 |
| 2014/0195662 | A1* | 7/2014 | Pulipakkam | H04L 67/10 709/223 |
| 2016/0321452 | A1* | 11/2016 | Richardson | G06F 21/50 |
| 2017/0163787 | A1* | 6/2017 | Xu | H04M 1/72406 |
| 2017/0286141 | A1* | 10/2017 | Adler | G06F 21/53 |

OTHER PUBLICATIONS

Milin-Ashmore, How to Downgrade an Android App If You Don't Like the Update, 2016.*
Yawnick, How to Reinstall Older Versions of Apps on your iPhone or iPad, Jan. 2019.*

* cited by examiner

*Primary Examiner* — Minh Dinh
(74) *Attorney, Agent, or Firm* — FisherBroyles, LLP

(57) ABSTRACT

The disclosed computer-implemented method for restoring applications may include (i) detecting an indication to restore a previous version of an application installed within a mobile operating system environment, (ii) retrieving the previous version of the application from a protected location within the mobile operating system environment where a sandboxing security component stored the previous version of the application, and (iii) executing the previous version of the application within a security sandbox managed by the sandboxing security component. Various other methods, systems, and computer-readable media are also disclosed.

20 Claims, 6 Drawing Sheets

SYSTEMS AND METHODS FOR RESTORING APPLICATIONS

BACKGROUND

Users of mobile devices, such as ANDROID and APPLE smart phones, are frequently encouraged to update their applications to the most current versions. Nevertheless, updating applications in this manner may result in some undesirable consequences. For example, the update might cause a program to crash, or the update might remove functionality that a corresponding user desired. As one illustrative example, a major update to a popular mobile device application recently resulted in large numbers of users being extremely upset about a major interface change that the users were unable to reverse.

In particular, the ANDROID mobile operating system permits one installation of an application at a given time for a specific device. Due to this feature of the ANDROID mobile operating system, it can be difficult to effectively rollback or restore previous versions of installed applications. For example, the ANDROID ecosystem only offers a one-way upgrade, and this upgrade is always directed to the most current version of the application, thereby preventing users from conveniently restoring previous versions of the same application. Furthermore, in some scenarios it may be possible to restore previous versions of an application by using a side-loading technique, yet this technique is cumbersome and has undesirable side effects, such as unlinking the installed application from the marketplace and losing private application state and other data. The present disclosure, therefore, identifies and addresses a need for improved systems and methods for restoring applications.

SUMMARY

As will be described in greater detail below, the present disclosure describes various systems and methods for restoring applications. In one example, a computer-implemented method for restoring applications may include (i) detecting an indication to restore a previous version of an application installed within a mobile operating system environment, (ii) retrieving the previous version of the application from a protected location within the mobile operating system environment where a sandboxing security component stored the previous version of the application, and (iii) executing the previous version of the application within a security sandbox managed by the sandboxing security component.

In one embodiment, the indication to restore the previous version of the application may include a request to restore the previous version of the application. In one embodiment, the request to restore the previous version of the application may include a request from a user of the mobile operating system environment to restore the previous version of the application.

In one embodiment, the indication to restore the previous version of the application further may include an indication of which specific version of the application to restore. In one embodiment, the sandboxing security component references an application instance identifier that corresponds to the specific version of the application to retrieve the previous version of the application.

In one embodiment, the sandboxing security component may include an application launcher. In one embodiment, the application launcher may include an alternative application launcher that previously replaced a default application launcher for the mobile operating system environment. In one embodiment, the application launcher stored the previous version of the application within the protected location upon installation of the previous version of the application.

In one embodiment, the sandboxing security component has exclusive access to the protected location. In one embodiment, the sandboxing security component manages the security sandbox at least in part through application virtualization based on file access request redirection.

In one embodiment, a system for implementing the above-described method may include (i) a detection module, stored in memory, that detects an indication to restore a previous version of an application installed within a mobile operating system environment, (ii) a retrieval module, stored in memory, that retrieves the previous version of the application from a protected location within the mobile operating system environment where a sandboxing security component stored the previous version of the application, (iii) an execution module, stored in memory, that executes the previous version of the application within a security sandbox managed by the sandboxing security component, and (iv) at least one physical processor configured to execute the detection module, the retrieval module, and the execution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an indication to restore a previous version of an application installed within a mobile operating system environment, (ii) retrieve the previous version of the application from a protected location within the mobile operating system environment where a sandboxing security component stored the previous version of the application, and (iii) execute the previous version of the application within a security sandbox managed by the sandboxing security component.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
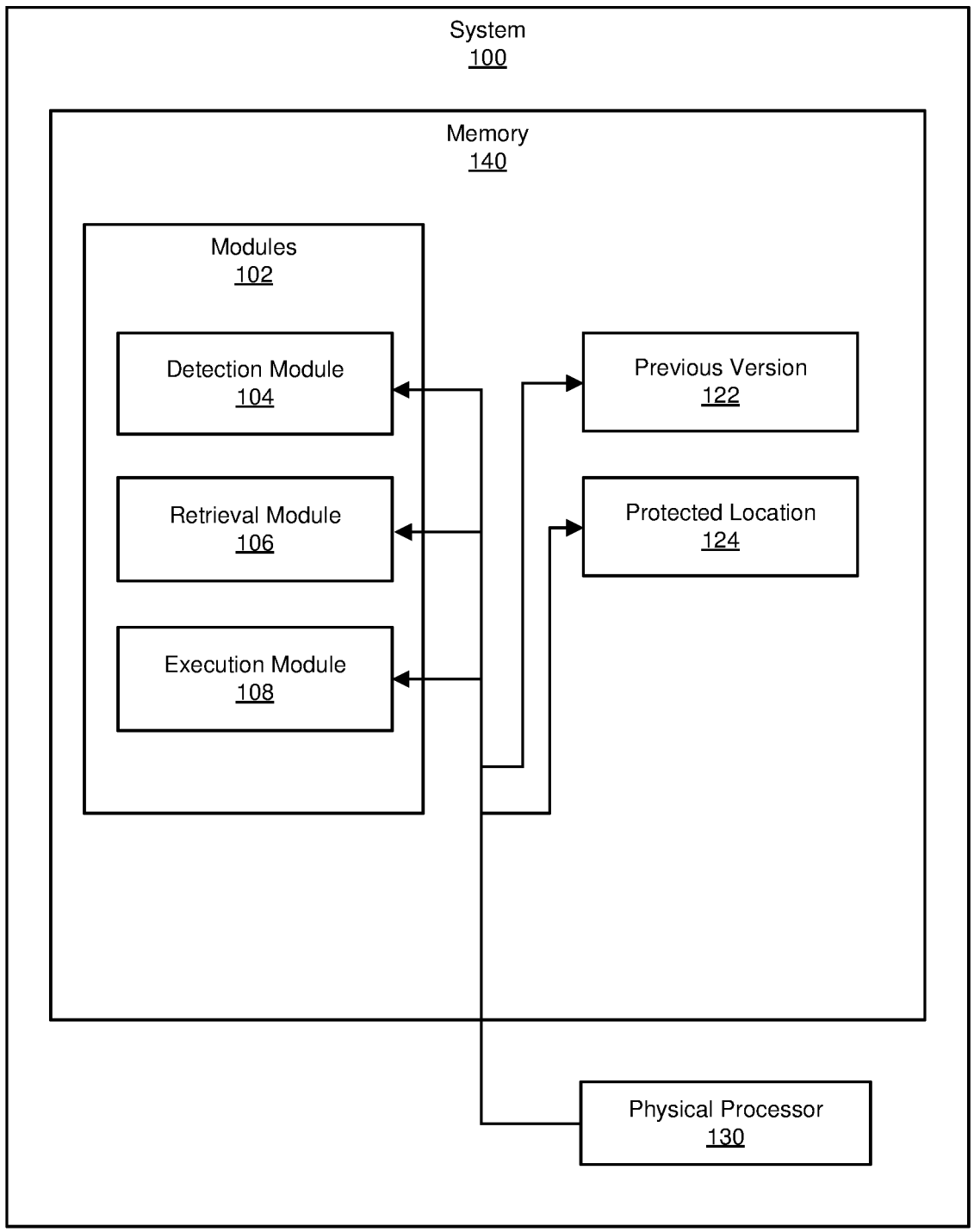
FIG. 1 is a block diagram of an example system for restoring applications.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for restoring applications. The disclosed subject matter may improve upon related systems by leveraging novel and inventive techniques for sandboxing applications within a mobile operating system environment. The sandboxing techniques may enable a security application to intercept one or more attempted actions by third-party applications within the mobile operating system environment, and thereby apply security policies accordingly. Additionally, the disclosed subject matter in this application may further leverage the sandboxing techniques to streamline a process for conveniently restoring an application to a previous version of the application. In some mobile operating system environments, such as the ANDROID operating system environment, restoring applications to previous versions of themselves may be cumbersome, impractical, or even impossible, depending on the circumstances. For example, these operating systems may enforce a policy such that only a single instance of an application may be installed at a single time. Moreover, these operating systems may not include any default or built-in virtualization technology. The disclosed subject matter may overcome these deficiencies to enable users to conveniently and efficiently restore applications to any one or more of multiple previous versions of the applications.

Figure 2:
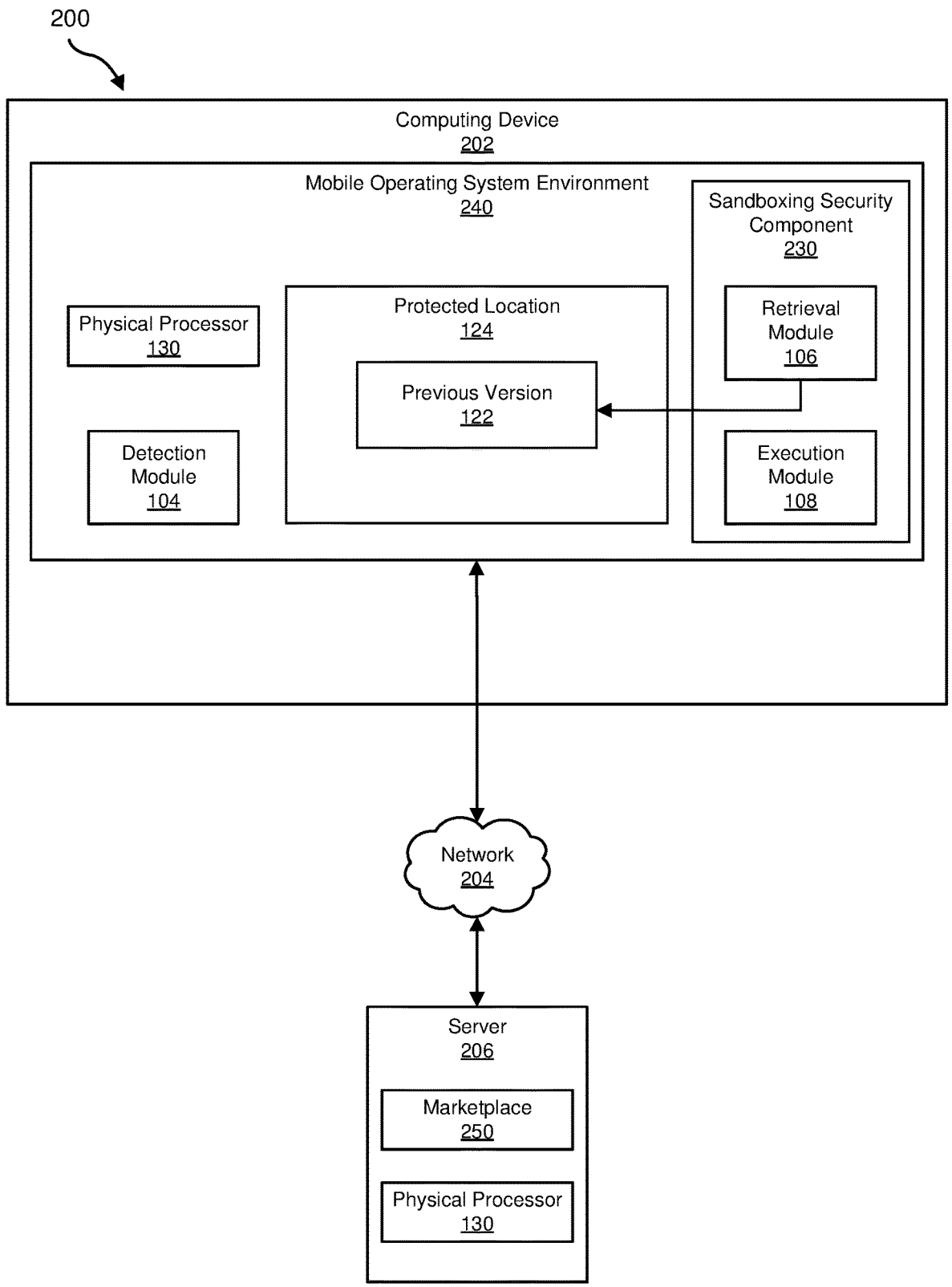
FIG. 2 is a block diagram of an additional example system for restoring applications.

The following will provide, with reference to FIGS. 1-2, detailed descriptions of example systems for restoring applications. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for restoring applications. As illustrated in this figure, example system 100 may include one or more modules 102 for performing one or more tasks. For example, and as will be explained in greater detail below, example system 100 may include a detection module 104 that detects an indication to restore a previous version 122 of an application installed within a mobile operating system environment. To be more specific, previous version 122 may include (i) a binary or other executable code for the previous version of the application (i.e., this binary may be distributed and downloaded from a corresponding application marketplace) and/or (ii) the associated private application state and other metadata (i.e., this metadata may correspond to runtime state data that the application has been maintaining while the user was using the application). Example system 100 may additionally include a retrieval module 106 that retrieves previous version 122 of the application from a protected location 124 within the mobile operating system environment where a sandboxing security component stored previous version 122 of the application. Example system 100 may also include an execution module 108 that executes previous version 122 of the application within a security sandbox managed by the sandboxing security component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate restoring applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to restore applications.

For example, and as will be described in greater detail below, detection module 104 may detect an indication to restore previous version 122 of an application installed within a mobile operating system environment 240. Retrieval module 106 may retrieve previous version 122 of the application from protected location 124 within mobile operating system environment 240 where a sandboxing security component 230 stored previous version 122 of the application. Execution module 108 may execute previous version 122 of the application within a security sandbox managed by sandboxing security component 230.

Computing device 202 generally represents any type or form of computing device capable of reading computer-executable instructions. Illustrative examples of computing device 202 include personal and business handheld client-side computing devices. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. In one illustrative example, server 206 may correspond to a backend server that provides a marketplace 250 for downloading and installing one or more applications within a mobile operating system environment. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
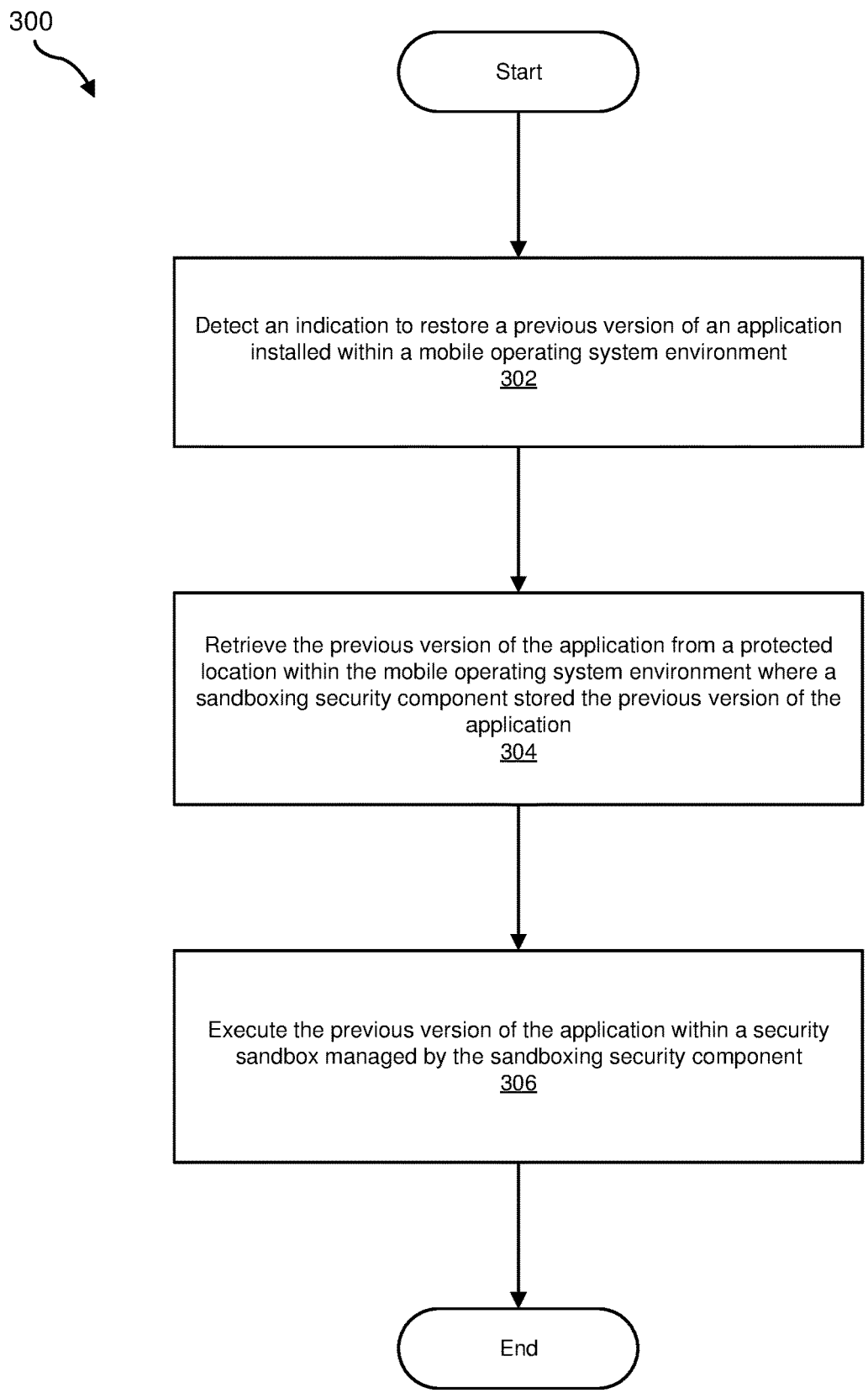
FIG. 3 is a flow diagram of an example method for restoring applications.

FIG. 3 is a flow diagram of an example computer-implemented method 300 for restoring applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect an indication to restore a previous version of an application installed within a mobile operating system environment. For example, detection module 104 may, as part of computing device 202 in FIG. 2, detect an indication to restore previous version 122 of an application installed within mobile operating system environment 240.

Detection module 104 may detect the indication to restore the previous version of the application in a variety of ways. For example, detection module 104 may detect the indication at least in part by receiving the indication from another software module or application. Additionally, or alternatively, detection module 104 may detect the indication at least in part by receiving the indication from a user of the mobile operating system environment. In one specific example, the user of the mobile operating system environment may issue a request to restore the previous version of the application.

For example, the user of the mobile operating system environment may interact with a graphical user interface of computing device 202 to thereby issue a request to restore the previous version of the application. In further examples, the request to restore the previous version of the application may further specify the particular version of the application that the user requests to be restored. In some scenarios, sandboxing security component 230 may have previously stored multiple different legacy versions of the application within protected location 124, thereby enabling the user of the mobile operating system environment to select from multiple different legacy versions of the application when deciding which one of these versions to restore.

At step 304, one or more of the systems described herein may retrieve the previous version of the application from a protected location within the mobile operating system environment where a sandboxing security component stored the previous version of the application. For example, retrieval module 106 may, as part of computing device 202 in FIG. 2, retrieve previous version 122 of the application from protected location 124 within mobile operating system environment 240 where sandboxing security component 230 stored previous version 122 of the application. As used herein, the term "sandboxing security component" generally refers to any software, firmware, and/or hardware component that effectively sandboxes one or more applications, such as the application corresponding to previous version 122, to thereby intercept one or more attempted actions or input/output operations from the application and apply one or more security policies to these attempted actions. In some illustrative examples, the sandboxing security component may correspond to an alternative application launcher that a user or other entity has configured to replace a default alternative application launcher to thereby control, monitor, and manage the execution of other third-party applications within the mobile operating system environment.

Retrieval module 106 may retrieve the previous version of the application in a variety of ways. In one embodiment, the sandboxing security component references an application instance identifier that corresponds to the specific version of the application to retrieve the previous version of the application. For example, when saving one or more instances of the application within protected location 124, the sandboxing security component may mark each of these instances with a corresponding application instance identifier, such as a numerical value. In some examples, the application instance identifier may simply mimic a corresponding version number for that version of the application. In other examples, the application instance identifier may simply map to numerical values for the version of the application, and this mapping may be stored within an appropriate table that the sandboxing security component may reference.

In one embodiment, the sandboxing security component may include an application launcher. For example, in some scenarios, the sandboxing security component may correspond to an alternative application launcher that previously replaced a default application launcher for the mobile operating system environment. In further examples, a user of the mobile operating system environment may have replaced the default application launcher with the alternative application launcher. The application launcher may correspond to the "home screen" of the mobile operating system environment. Furthermore, the application launcher may control how one or more applications are executed in response to a user issuing a request for these applications to execute. More specifically, the application launcher may intercept one or more requests to execute these applications, and may thereby further intercept and control the execution of these applications. In some examples, the application launcher may effectively inject hooks to capture file access requests, and/or other input/output operations, in connection with a newly executing application, thereby enabling the application launcher to redirect one or more of these requests to a different virtualized environment than the application originally specified. In some specific examples, the application launcher may have been sandboxed via the same sandboxing security component that is used for restoring previous versions of applications in accordance with method 300, as further discussed above.

In one embodiment, the application launcher stored the previous version of the application within the protected location upon installation of the previous version of the application. For example, to improve the security functionality provided by the sandboxing security component, the sandboxing security component, such as a suitable application launcher as described above, may detect that an application is being installed within the mobile operating system environment. Upon detecting this installation procedure, the sandboxing security component may store this particular version of the application within protected location 124. Protected location 124 may correspond to a protected location within memory of the mobile operating system environment, and in some scenarios the sandboxing security component may have exclusive access to protected location 124. Upon future attempts to execute the application, the sandboxing security component may intercept these attempts and thereby load the version of the application that was previously stored within protected location 124. Accordingly, the sandboxing security component may load the version of the application, from protected location 124, within a security sandbox that is managed by the sandboxing security component.

The sandboxing security component may perform this operation as a matter of course simply to enable the sandboxing security component to effectively sandbox the application when it executes in the future, and thereby further enabling the sandboxing security component to apply one or more security policies during the execution of the application. Nevertheless, the fact that the sandboxing security component may store one or more versions of the application within protected location 124, as a matter of course, may further enable the sandboxing security component to conveniently restore previous versions of the application, which might otherwise be impractical or impossible within the mobile operating system environment, such as the ANDROID mobile operating system environment.

From within the security sandbox, the sandboxing security component may be enabled to intercept any or all input/output operations in connection with the application and thereby apply one or more security policies to these attempted input/output operations. In further embodiments, the sandboxing security component manages the security sandbox at least in part through application virtualization based on file access request redirection. For example, the sandboxing security component may intercept an input/output operation that is directed to a target memory location (e.g., "/data/data/<app_packagename>/shared_prefs/<app_packagename>_preferences.xml") and redirect the corresponding input/output operation to a different target memory location (e.g., "/data/data/com.symantec.appvirtualization/virtual_apps/<app_packagename>/<app_instance_id>/shared_prefs/<app_packagename>_preferences.xml").

At step 306, one or more of the systems described herein may execute the previous version of the application within a security sandbox managed by the sandboxing security component. For example, execution module 108 may, as part of computing device 202 in FIG. 2, execute previous version 122 of the application within a security sandbox managed by sandboxing security component 230.

Execution module 108 may execute the previous version of the application in a variety of ways. As further outlined above, execution module 108 may, as part of sandboxing security component 230, load the previous version of the application from protected location 124. From protected location 124, execution module 108 may optionally load the previous version of the application into a security sandbox managed by sandboxing security component 230. After the previous version of the application has been inserted within the security sandbox managed by sandboxing security component 230, execution module 108 may execute the previous version of the application from within the security sandbox. Executing the previous version of the application from within the security sandbox may enable sandboxing security component 230 to effectively monitor, intercept, and/or manipulate one or more input/output operations that are attempted by the previous version of the application upon execution.

For example, the sandboxing security component may intercept one or more input/output operations and subsequently apply one or more security policies to the intercepted input/output operations. In some illustrative examples, the sandboxing security component may determine that the input/output operation is permissible and thereby permit the input/output operation to proceed normally. In further examples, the sandboxing security component may determine that the input/output operation potentially violates one or more security policies, and in response the sandboxing security component may optionally manipulate, edit, revise, or simply block execution of the input/output operation.

In order to apply the security policies within the security sandbox managed by the sandboxing security component, the sandboxing security component may, as a matter of course, store versions of these applications within protected location 124. Accordingly, the sandboxing security component may provide the additional benefit, in addition to all of the security sandboxing benefits outlined above, of enabling a user to conveniently restore one or more previous versions of the application that is executed within the security sandbox. For example, each time the application is updated to a new version within the mobile operating system environment, the sandboxing security component may optionally store a copy of this version within protected location 124.

Accordingly, at a future point in time, the sandboxing security component may have previously stored three different legacy versions of the application, while also further storing a current version of the application. At this point in time, the user may conveniently leverage the sandboxing security component to potentially restore the application to any one of the three different legacy versions of the application that were previously stored to protected location 124. The user may optionally specify the specific numerical value for the version of the application that the user wishes to restore, and the sandboxing security component may reference this numerical value, in connection with an application instance identifier, to thereby restore the corresponding version of the application. This convenient and streamlined technique for restoring previous versions of applications within the mobile operating system environment, such as the ANDROID mobile operating system environment, may overcome limitations that are associated with this mobile operating system environment, because the mobile operating system environment by default may render it impractical or impossible to restore previous versions of applications, as further discussed above.

Figure 4:
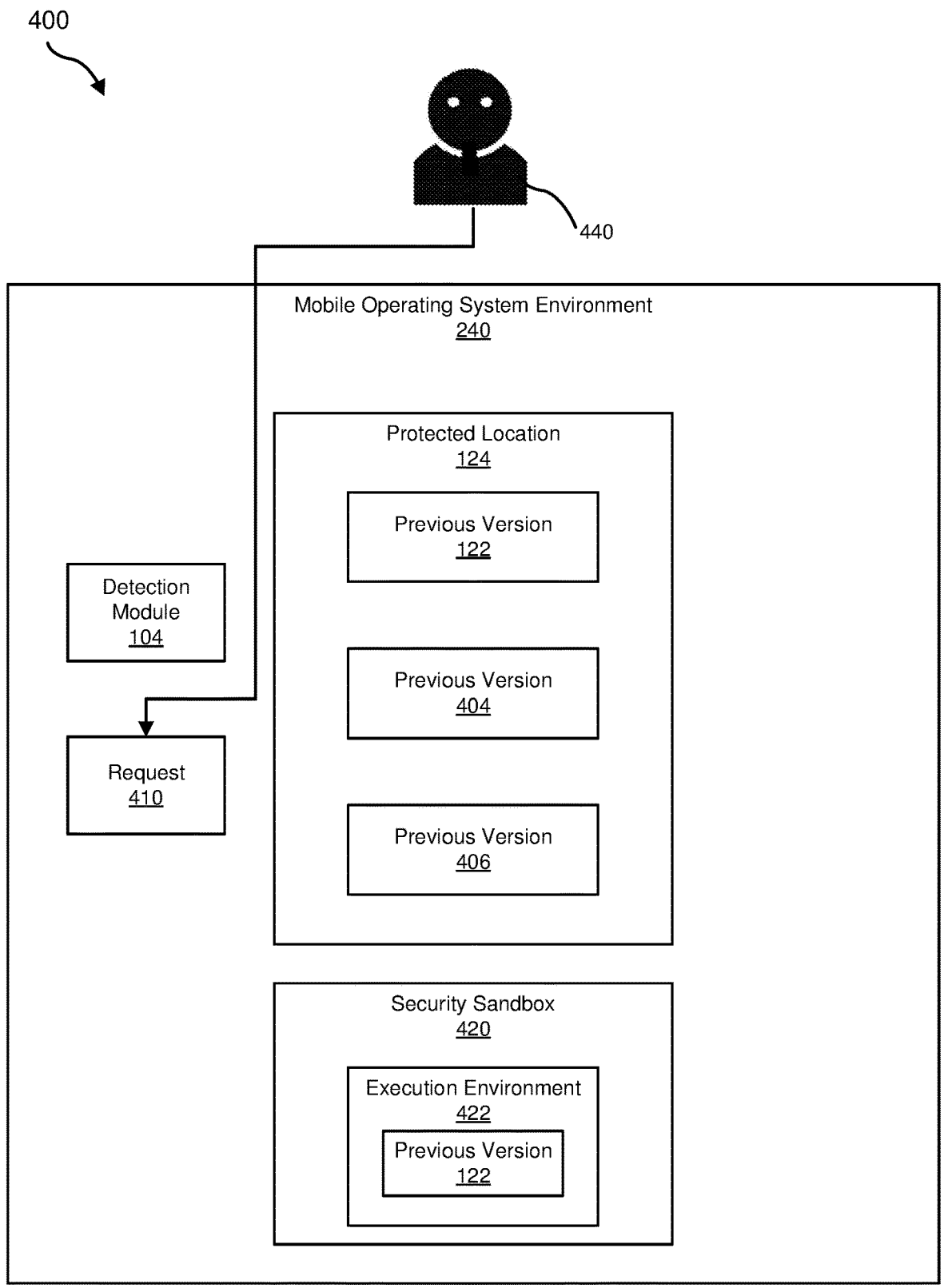
FIG. 4 is a block diagram of an example workflow corresponding to the method for restoring applications.

FIG. 4 shows an example illustrative workflow 400 that may further highlight how the disclosed subject matter may operate in one embodiment. As further shown in this figure, workflow 400 may include a user 440 who issues a request 410. Request 410 may correspond to a request from user 440 to roll back an application installed within mobile operating system environment 240 to a previous version. FIG. 4 also further illustrates how mobile operating system environment 240 may include protected location 124, which may further include previously stored copies of legacy versions of the application. More specifically, protected location 124 may store previous version 122, as discussed above, and may also further store a previous version 404 and a previous version 406.

Detection module 104 may detect request 410 to restore the application to the previous version of the application. In some specific examples, request 410 may further specify a particular version to which the application should be restored. For example, request 410 may include an identifier of the application that distinguishes between previous version 122, previous version 404, and previous version 406. Accordingly, upon detecting request 410, detection module 104 may thereby trigger the further performance of method 300, in coordination with retrieval module 106 and execution module 108, as further discussed above. In the specific example of FIG. 4, request 410 may have specified previous version 122, as distinct from previous version 404 or previous version 406, as the previous version of the application to which the application should be restored. Accordingly, retrieval module 106 may retrieve previous version 122 from protected location 124 and subsequently retrieval module 106 may copy or insert previous version 122 into a security sandbox 420 so that previous version 122 may execute within an execution environment 422 within security sandbox 420.

As further discussed above, sandboxing security component 230 may manage and/or operate security sandbox 420. Accordingly, after retrieval module 106 effectively retrieves and inserts a copy of previous version 122 within security sandbox 420, execution module 108 may execute previous version 122 within security sandbox 420. Executing previous version 122 within security sandbox 420 may enable sandboxing security component 230 to intercept one or more attempted actions on the part of previous version 122, and may further enable sandboxing security component 230 to apply one or more security policies in response to intercepting these attempted actions. As further discussed above, regardless of any rollback functionality, sandboxing security component 230 may store one or more versions of the application within protected location 124 as a matter of course, simply to enable the sandboxing security functionality that is outlined at length above. Nevertheless, in addition to the sandboxing security functionality that results from this operation of copying application versions to protected location 124, the disclosed subject matter may also further provide the benefit of enabling users to conveniently restore one or more applications to any one of previously saved versions of those applications within protected location 124, even when an operating system environment, such as the ANDROID operating system environment would otherwise make this cumbersome, impractical, or even impossible, depending on the circumstances.

The above discussion provides a general overview of method 300 shown in FIG. 3. Furthermore, the following discussion provides a supplemental overview of additional or alternative concrete embodiments of the disclosed subject matter.

The disclosed subject matter may potentially restore an application to an older version of its binary, while also potentially maintaining the full integrity of application settings and policies from previous states. The disclosed subject matter may leverage application virtualization technology to enable a user to rollback an application to one or more previous versions of the application.

The following discussion provides an overview of how one embodiment of the disclosed subject matter may operate. First, when an application is installed or updated, the disclosed subject matter may reference standard mobile operating system application programming interfaces (e.g., ANDROID APIs) to copy the application package (APK) from its installation directory to a separate private location. This private location may be only accessible to the virtualization/sandboxing application corresponding to method 300, as discussed above. Moving the application package to the private location may help to ensure that the application binary is not modified or removed.

As a second step, when a user desires to execute the application, the disclosed subject matter may load the application package (e.g., APK) from the private location and thereby inject the package into the sandboxed environment. From the perspective of the user operating the mobile operating system environment, the execution of the application may be indistinguishable from regular and normal execution of the application. Nevertheless, from the perspective of the operating system, the application may be executing within the context of the virtualization/sandboxing application. In some examples, this virtualization/sandboxing application may be labeled as a "host application."

Third, executing the application within the sandbox creates the ability to monitor everything that the application does. The disclosed subject matter may be able to see the permissions that the application requests, and also to see whether these requests are granted or rejected. Additionally, the virtualization/sandboxing application may further review the services that the application accesses. Perhaps most importantly, any input/output operations that the application attempts to perform may also be visible to the virtualization/sandboxing application.

Fourth, the disclosed subject matter may optionally create a mapping for some or all of the input/output operations corresponding to the application. These mappings may map real locations for operations (e.g., the path that the application "thinks" it is working with) to one or more corresponding virtualized locations (e.g., the path that the application is really working with). As one specific example, there may be a scenario where an application requests to read its shared preferences. On ANDROID, the shared preferences may correspond to a simple XML file stored in the application's private location. When the application, executing within the security sandbox, attempts to read its shared preferences, it will attempt to access the file from the following location: "/data/data/<app_packagename>/shared_prefs/<app_packagename>_preferences.xml". Nevertheless, the disclosed subject matter may effectively redirect this "real" path to a "virtual" path, which may correspond to "/data/data/com.symantec.appvirtualization/virtual_apps/<app_packagename>/<app_instance_id>/shared_prefs/<app_packagename>_preferences.xml".

One helpful insight relating to the implementation of the disclosed subject matter is the concept of an application instance identifier. The disclosed subject matter may use this application instance identifier to determine which version of the application to execute. Each time the state of the application is safe, the disclosed subject matter may optionally create a new application instance identifier for that state. For example, if the user updates the application within the GOOGLE PLAY mobile operating system application marketplace, the disclosed subject matter may also optionally use a new application instance identifier as well.

Lastly, the disclosed subject matter may actually perform the rollback and restoration of the previous version of the application. To achieve this functionality, the disclosed subject matter may simply launch the virtualized application within the security sandbox, and the disclosed subject matter may specify which version of the application to execute at least in part by referencing the application instance identifier that is further discussed above.

The disclosed subject matter may improve upon related systems by leveraging novel and inventive techniques for sandboxing applications within a mobile operating system environment. The sandboxing techniques may enable a security application to intercept one or more attempted actions by third-party applications within the mobile operating system environment, and thereby apply security policies accordingly. Additionally, the disclosed subject matter in this application may further leverage the sandboxing techniques to streamline a process for conveniently restoring an application to a previous version of the application. In some mobile operating system environments, such as the ANDROID operating system environment, restoring applications to previous versions of themselves may be cumbersome, impractical, or even impossible, depending on the circumstances. For example, these operating systems may enforce a policy such that only a single instance of an application may be installed at a single time. Moreover, these operating systems may not include any default or built-in virtualization technology. The disclosed subject matter may overcome these deficiencies to enable users to conveniently and efficiently restore applications to any one or more of multiple previous versions of the applications.

Figure 5:
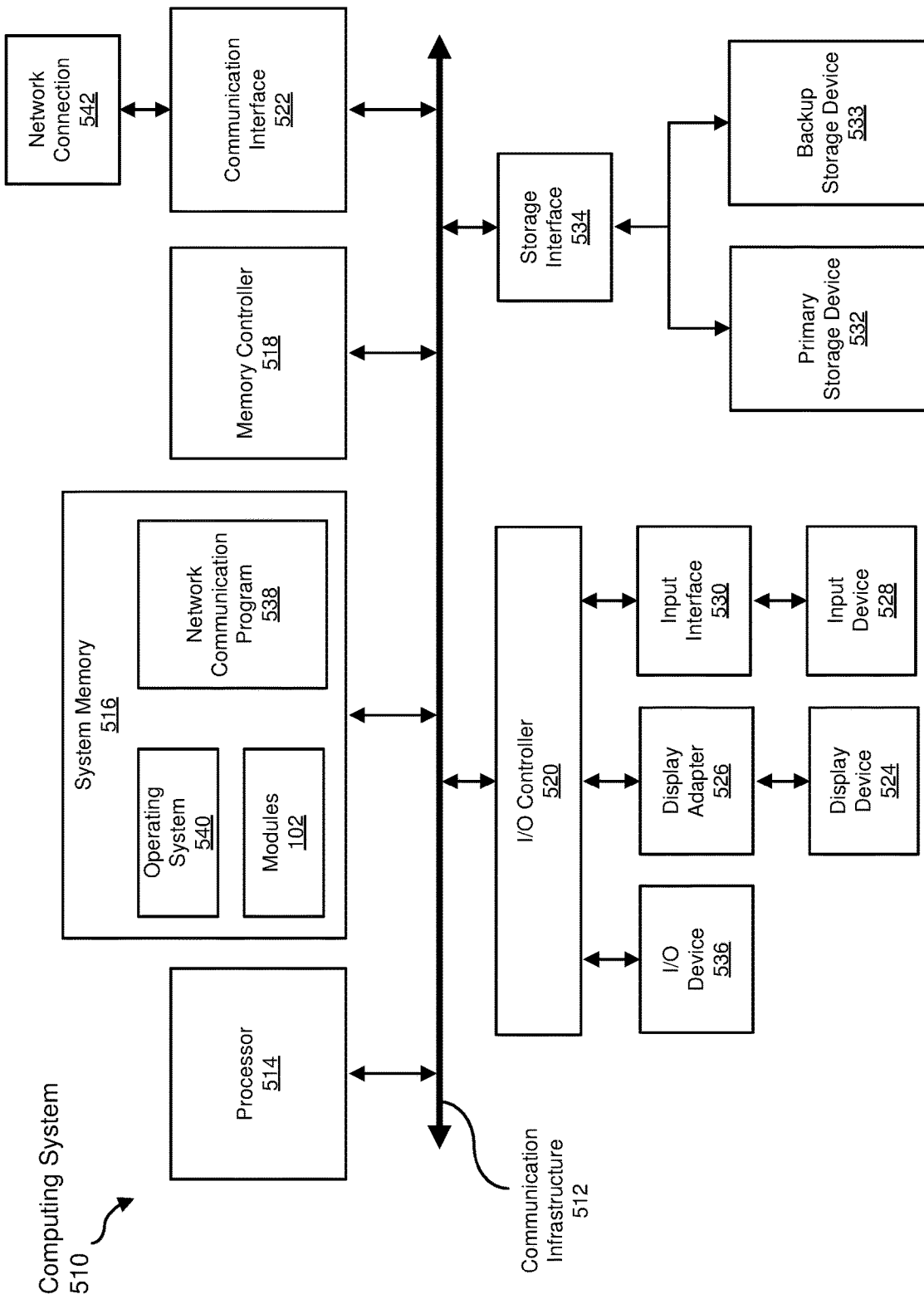
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
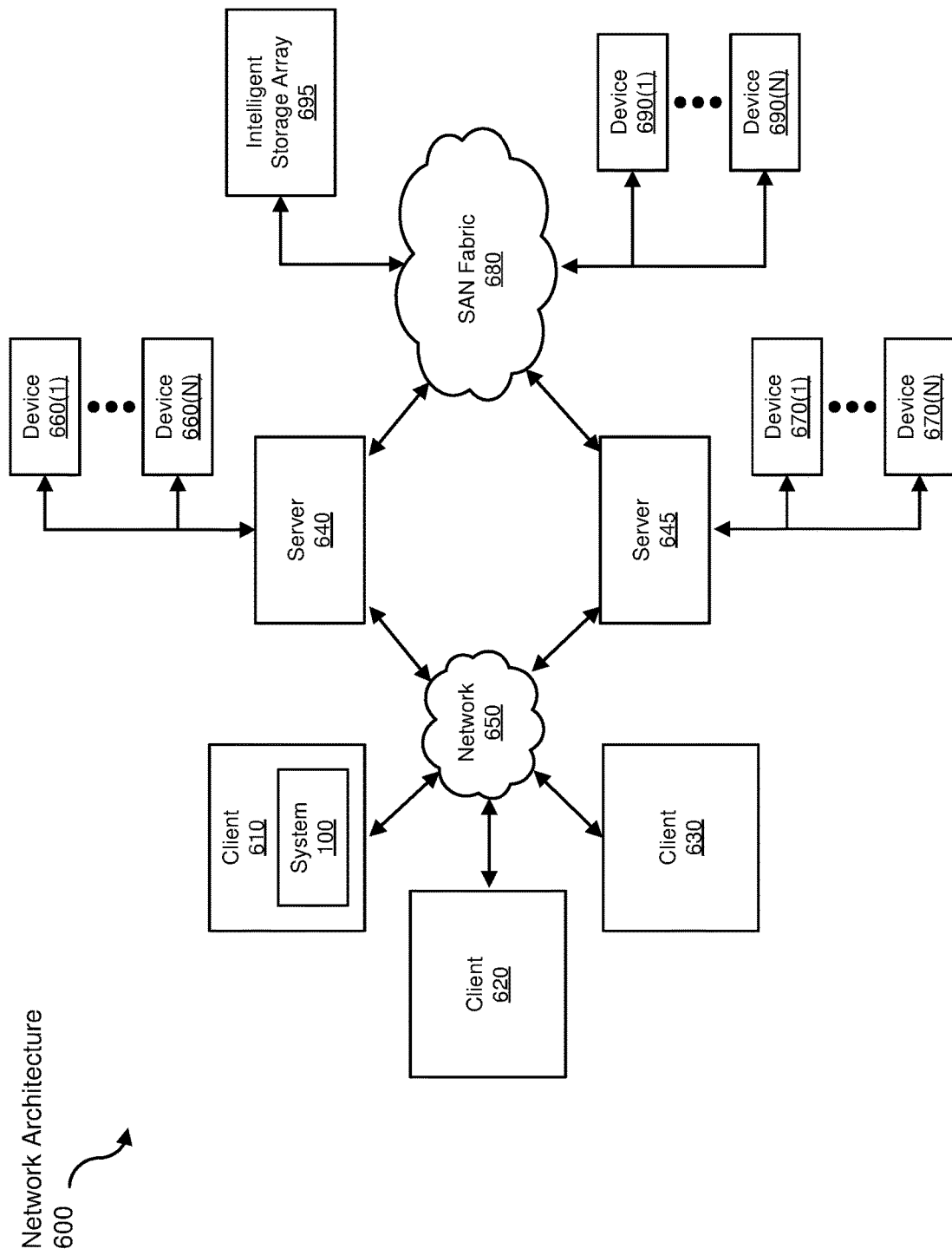
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for restoring applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restoring applications, at least a portion of the method being performed by a computing device comprising at least one processor, the method comprising:
    detecting an indication to restore a previous version of an application installed within a mobile operating system environment;
    retrieving the previous version of the application from a protected location within the mobile operating system environment where a sandboxing security component stored the previous version of the application; and
    executing the previous version of the application within a security sandbox managed by the sandboxing security component.

2. The computer-implemented method of claim 1, wherein the indication to restore the previous version of the application comprises a request to restore the previous version of the application.

3. The computer-implemented method of claim 2, wherein the request to restore the previous version of the application comprises a request from a user of the mobile operating system environment to restore the previous version of the application.

4. The computer-implemented method of claim 1, wherein the indication to restore the previous version of the application further comprises an indication of which specific version of the application to restore.

5. The computer-implemented method of claim 4, wherein the sandboxing security component references an application instance identifier that corresponds to the specific version of the application to retrieve the previous version of the application.

6. The computer-implemented method of claim 1, wherein the sandboxing security component comprises an application launcher.

7. The computer-implemented method of claim 6, wherein the application launcher comprises an alternative application launcher that previously replaced a default application launcher for the mobile operating system environment.

8. The computer-implemented method of claim 6, wherein the application launcher stored the previous version of the application within the protected location upon installation of the previous version of the application.

9. The computer-implemented method of claim 1, wherein the sandboxing security component has exclusive access to the protected location.

10. The computer-implemented method of claim 1, wherein the sandboxing security component manages the security sandbox at least in part through application virtualization based on file access request redirection.

11. A system for restoring applications, the system comprising:
    a detection module, stored in memory, that detects an indication to restore a previous version of an application installed within a mobile operating system environment;
    a retrieval module, stored in memory, that retrieves the previous version of the application from a protected location within the mobile operating system environment where a sandboxing security component stored the previous version of the application;
    an execution module, stored in memory, that executes the previous version of the application within a security sandbox managed by the sandboxing security component; and
    at least one physical processor configured to execute the detection module, the retrieval module, and the execution module.

12. The system of claim 11, wherein the indication to restore the previous version of the application comprises a request to restore the previous version of the application.

13. The system of claim 12, wherein the request to restore the previous version of the application comprises a request from a user of the mobile operating system environment to restore the previous version of the application.

14. The system of claim 11, wherein the indication to restore the previous version of the application further comprises an indication of which specific version of the application to restore.

15. The system of claim 14, wherein the sandboxing security component references an application instance identifier that corresponds to the specific version of the application to retrieve the previous version of the application.

16. The system of claim 11, wherein the sandboxing security component comprises an application launcher.

17. The system of claim 16, wherein the application launcher comprises an alternative application launcher that previously replaced a default application launcher for the mobile operating system environment.

18. The system of claim 16, wherein the application launcher stored the previous version of the application within the protected location upon installation of the previous version of the application.

19. The system of claim 11, wherein the sandboxing security component has exclusive access to the protected location.

20. A non-transitory computer-readable medium comprising one or more computer-readable instructions that, when executed by at least one processor of a computing device, cause the computing device to:
    detect an indication to restore a previous version of an application installed within a mobile operating system environment;
    retrieve the previous version of the application from a protected location within the mobile operating system environment where a sandboxing security component stored the previous version of the application; and
    execute the previous version of the application within a security sandbox managed by the sandboxing security component.

* * * * *